United States Patent
Munz et al.

(10) Patent No.: US 6,837,117 B2
(45) Date of Patent: Jan. 4, 2005

(54) DEVICE AND METHOD FOR MEASURING A FORCE COMPONENT OR TORQUE COMPONENT

(75) Inventors: Michael Munz, Reutlingen (DE); Kurt Weiblen, Metzingen (DE); Andreas Stratmann, Gomaringen (DE); Gerhard Wiest, Rottenburg (DE); Conrad Haeussermann, Sonnenbuehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/470,835

(22) PCT Filed: Nov. 27, 2002

(86) PCT No.: PCT/DE02/04339

§ 371 (c)(1),
(2), (4) Date: Dec. 16, 2003

(87) PCT Pub. No.: WO03/048699

PCT Pub. Date: Jun. 12, 2003

(65) Prior Publication Data

US 2004/0089068 A1 May 13, 2004

(30) Foreign Application Priority Data

Dec. 4, 2001 (DE) .......................................... 101 59 474

(51) Int. Cl.[7] .................................................. G01L 1/04
(52) U.S. Cl. .................................................. 73/862.629
(58) Field of Search .................. 73/849, 852, 862.632, 73/862.621, 862.629

(56) References Cited

U.S. PATENT DOCUMENTS

| | | | | | |
|---|---|---|---|---|---|
| 4,467,661 | A | * | 8/1984 | Somal | 73/862.382 |
| 4,558,600 | A | * | 12/1985 | Lee | 73/862.626 |
| 4,806,755 | A | * | 2/1989 | Duerig et al. | 250/306 |
| 4,899,600 | A | * | 2/1990 | Lee | 73/862.626 |
| 5,624,132 | A | | 4/1997 | Blackburn et al. | |
| 6,129,168 | A | | 10/2000 | Lotito et al. | |
| 6,206,290 | B1 | * | 3/2001 | Giebel et al. | 235/462.36 |
| 6,269,687 | B1 | * | 8/2001 | Zhang et al. | 73/105 |

* cited by examiner

*Primary Examiner*—Max Noori
(74) *Attorney, Agent, or Firm*—Kenyon & Kenyon

(57) ABSTRACT

A device and method for measuring at least one of a force component and a torque component. The device includes a deformation member, for measuring at least one of a force component and torque component, a separate measuring element, configured to measure at least one force component, and an electronics unit, connected to the measuring element configured to evaluate a measuring signal of the measuring element. The deformation member includes a base part and at least one tongue movable with respect to the base part. The base part is arranged so that a gap between the measuring element and the tongue has a gap width variable in response to the force component introduced onto the deformation member. The measuring element is configured to convert a change in the gap width into a measuring signal. The method includes the step of changing the gap width between the tongue and the measuring element by introducing the force component into the deformation member. The method further includes the step of detecting the change in the gap width by the measuring element. The method further includes the step of directing the measuring signal by the measuring element to the electronics unit for further processing as a function of the change in the gap width.

26 Claims, 3 Drawing Sheets

DEVICE AND METHOD FOR MEASURING A FORCE COMPONENT OR TORQUE COMPONENT

This application is a 371 of PCT/DE02/04339 Nov. 27, 2002.

FIELD OF THE INVENTION

The present invention relates to a device and a method for measuring a force component or torque component. In particular, the device and the method are suitable for determining the weight of an object.

BACKGROUND INFORMATION

A multitude of devices and methods are conventional for measuring force components, the devices and methods using various physical effects to indicate the solution of the force measurement, and the force components measured in the devices and methods being converted to a measuring signal that can be analyzed in a simple manner. An example of this is a tensile/compressive force sensor, which functions according to the principal of strain gauges. Strain gauges are attached to a force-absorbing element and connected to a full-bridge circuit, which increases its electrical resistance in response to the action of a force and generates a bridge output voltage proportional to the measured variable.

However, in order to attain an optimum measuring accuracy, no transverse forces or torques may be applied to the sensor, i.e., the force may only be introduced in a specific direction. In addition, it is expensive to manufacture such a force sensor, since the strain gauges and the remaining components of the force sensor must be assembled to form a complex module.

It is an object of the present invention to provide a device and a method for measuring a force component or torque component, where the force components may be measured simply, inexpensively, and reliably.

SUMMARY

By designing a deformation member to have a base part and at least one tongue that is movable with respect to the base part, a gap is formed whose width may be varied by introducing a force component. A measuring element, which may function in a contactless manner, converts the change in the gap width to a measuring signal.

At least one guide device may be provided, which limits the mobility of the tongue in at least one direction, so that the tongue does not have unlimited mobility. On one hand, the guide device or guide devices prevent the tongue from being moved in an unsuitable manner with respect to the base part, by several, introduced force components or introduced, force components of different orientation, through which the measuring result is invalidated. On the other hand, the guide device or devices prevent the measuring element from being able to be ruined. Therefore, the relative movement of the tongue with respect to the base part is a guided movement, which provides an increased level of safety against mechanical destruction of the device.

Together with the electronics unit, the deformation member and the measuring element may take the form of separate modules, which means that separate manufacturing of the modules is possible. This allows the manufacturing operations of the two modules to be optimized separately from each other, and allows only the final assembly, i.e., the installation of the module having the measuring element and the electronics unit in the deformation member, to be accomplished as a joint working step.

In order to achieve an especially compact design and protect the electronics unit and the measuring element from mechanical damage, the measuring element and the electronics unit are positioned inside the deformation member. In this manner, the deformation member also assumes the function of a housing, in addition to providing a reference surface for measuring the displacement of the tongue with respect to the base part.

In an exemplary embodiment of the present invention the measuring element is an integral component of the electronics unit and takes the form of, e.g., a printed inductance coil with or without a core, on a printed circuit board made of plastic, ceramic, etc.

A one-piece construction formed, for example, by primary shaping or by milling out the receptacles for the module having the measuring element and the electronics unit increases the strength of the deformation member, and manufacturing it with the aid of a reshaping method particularly reduces the number of working steps and, thus, manufacturing time and costs. Furthermore, the one-piece manufacture of the deformation member from the base part and the tongue allows the possibility of utilizing the elastic characteristics of the deformation-member material for the elastic recovery of the tongue, when the force component or force components are no longer introduced.

In order to be able to realize a low wall thickness of the housing, even in the case of high loads, the deformation member is made of metal, such as steel or stainless steel, the elastic qualities of a metallic material being provided for the return movement of the tongue into the starting position.

The measuring element may take the form of a capacitor, inductance coil, piezoelectric element, or Hall-effect element and functions on a capacitive, inductive, piezoelectric, or magneto-elastic basis. The gap is compressed when a force is introduced onto the tongue or the deformation member, the motion being converted to an electrical signal proportional to the introduced force. The wear of the measuring element or the device is practically eliminated and simple recalibration is allowed because of the contactless measurement.

In an exemplary embodiment of the present invention, the guide device or devices is made of a bolt connected to the base part, or a space bushing, such as a round bolt or a round space bushing having a T-shaped cross section, and of a passage, which is positioned or formed at the tongue or the base part, and through which the bolt at least partially passes. The fact that the guide device takes the form of a bolt allows movement to be limited to a single movement direction, namely parallel to the longitudinal extension of the bolt, which means that it is possible to precisely measure the specific force component as a function of the orientation of the guide device. The direction of the force component may be selected and exactly determined as a function of the orientation of the guide device or the bolt, since no movements, or only slight movements, deviating from a movement perpendicular to the base part are allowed. In particular, no flexural torques are generated, which easily result in damage to the device and falsification of the measuring results.

A device is provided for limiting the movement of the tongue in the direction of the measuring element or the base part, in order that overload protection of the measuring element and the entire device is set up. In this manner, forces lying above the established measuring range are intercepted without destroying the device or the sensor.

Depending on the structural form of the tongue or the base part, it is provided that the gap width be adjusted to the measuring range, in order to allow use of it for various measuring purposes. In the case of a multipiece construction of the base part and tongue, this may be achieved by increasing the distance between the tongue and the base part with the aid of distance pieces. In the case of a one-piece construction, the tongue may be plastically deformed to increase the gap width, or the gap may be permanently enlarged by machining it. A reduction in the gap width is possible, for example, using separate components that are attachable to the tongue. For example, a plate may be cemented on or a set screw may be adjusted.

In an exemplary embodiment of the present invention, the flexural stiffness of the tongue may be changed by weakening the material or introducing bores having an adjusted diameter at various locations.

Specularly symmetric configurations of two tongues, which may have ends pointing in directions opposite to one another, allow generated torques to be measured in the event of a non-uniform load, e.g., a seat rail, and allow the corrected weight to be determined with the aid of mathematical adjustment. In addition, force-introduction ranges are provided for precisely introducing the force into the tongue, so that the measuring element or measuring elements may be precisely assigned to the location of the tongue displacement. This means that the measuring accuracy is increased.

In particular, in the case of a specularly symmetric configuration of the force-introduction regions, which may take the form of point-shaped projections or recesses having a small surface area, different displacements are metrologically determined in addition to introduced torques being mechanically compensated for, in that each force-introduction region is assigned a measuring element, so that the distribution of forces introduced into the tongue or the tongues may be determined. This is accomplished, for example, by a star-shaped configuration of the tongues or an arrangement of two measuring elements on the diametrically opposed corners of the tongue ends. When the tongues are positioned oppositely to each other, a rectangular or square formation of the measuring elements and the force-introduction regions is formed, by which the effective weight may easily be determined without interfering torques being generated or having to be considered.

In an exemplary embodiment of the method of the present invention for measuring a force component or torque component, such as the weight, the gap width is changed by introducing the force components onto the tongue, the measuring element detects the change in the gap width, and a measuring signal is routed to the electronics unit for further processing as a function of the change in the gap width. The direct conversion of the movement into an electrical signal proportional to the gap width and, thus, to the introduced force allows the force component to be determined in a simple manner and the measuring signal to be easily processed further.

The device may be used to detect the seat-occupancy and/or the occupant weight in a motor vehicle, through which, in particular, the airbag activation may be controlled and/or the fill level of the airbag may be adjusted.

DETAILED DESCRIPTION

Figure 1:
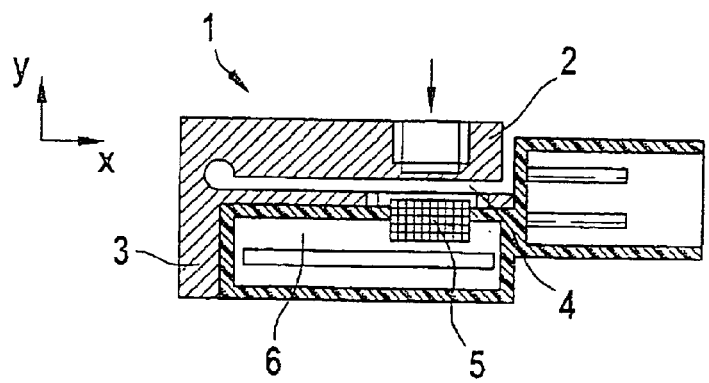
FIG. 1 is a cross-sectional view of an exemplary embodiment of the device.

FIG. 1 is a sectional view of an exemplary embodiment of device 1 for measuring a force component or torque component, on which a deformation member made of a base part 3 and a tongue 2 movable with respect to it is constructed. In the present example, the deformation member is formed in one piece, i.e., base part 3 and tongue 2 movable with respect to it were manufactured from a semifinished material in a primary shaping process or reshaping process, or by machining, or they are integrally connected to each other. An opening for accommodating a measuring unit 5 and an electronics unit 6 is formed inside the deformation member, so that the deformation member additionally constitutes the housing for measuring element 5 and electronics unit 6 formed together with it as a module. Formed between tongue 2 and base part 3 is a gap 4, whose width changes as a function of a force introduced in the direction of the arrow or the direction opposite to that of the arrow.

Measuring element 5, e.g., an inductance coil with or without a core, a Hall-effect element, a capacitor, or a similar, contactless measuring element, measures the decrease or the increase in the gap width and transmits the measuring signal to electronics unit 6. The measuring signal is directed from electronics unit 6 to an interface for further processing, which is not designated in any more detail.

Figure 2:
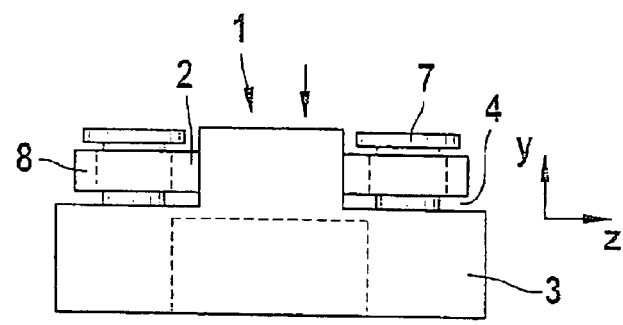
FIG. 2 a rear view of the device according to FIG. 1.

Shown in FIG. 2 is a rear view of device 1, in light of which the formation of gap 4 between base part 3 and tongue 2 may be recognized. The gap width changes by introducing a force component in the y direction or the direction opposite to the y direction, and a corresponding measuring signal may be detected.

A bolt 7 is provided for limiting the movement of tongue 2 in the y direction, the bolt being able to take, for example, the form of a welded bolt or a screw and accordingly being integrally connected to base part 3 or connected to it in a form-locked manner. Formed on the upper face of bolt 7 is a mushroom-shaped, flattened region, which limits the movement of tongue 2 in the y direction, so that it is not possible to widen gap 4 beyond an allowable or predetermined dimension. In this context, bolt 7 traverses a passage 8, which is formed by lugs that-are formed on tongue 2.

Figure 3:
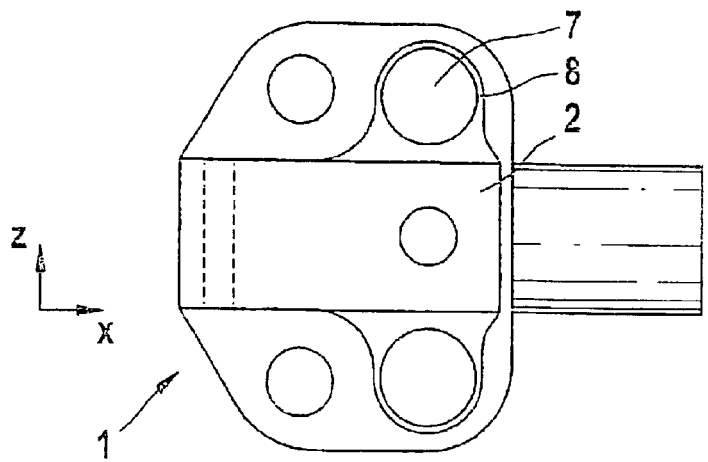
FIG. 3 is a plan view of the device according to FIG. 1.

This becomes clear from FIG. 3, in which it is illustrated that two protuberances are formed on the side of tongue 2, the protuberances having passages 8 through which the screws or welded bolts 7 are guided. These limit the possible movement of tongue 2 in the x, y, and z directions, base part 3 limiting the movement of tongue 2 in the negative y direction. This protects the device from overload, i.e., the forces that lie over the measuring range or point in an undesirable direction are intercepted without destroying the complete device or measuring element 5. An additional limitation to the movement of tongue 2 is provided in the negative y direction, as well, in order to define the maximum measuring range, if a limit stop is not desired on base part 3. Such a limitation may be formed by set screws, which means that the path of tongue 2 is mechanically limited in all directions.

This allows the device to be designed for any measuring ranges, independently of the electronics, by changing the geometry, in that, e.g., threaded bolt 7 is screwed in or screwed out. The same applies to adjusting the device for limiting the movement of tongue 2 in the direction of base part 3.

The modular construction of the deformation member, and of electronics unit 6 together with measuring element 5, which shown in the figures, allows separate manufacturing to be carried out, the interconnection of the two modules representing the only common operation. Measuring element 5 or the measuring pick-up may be an integrated part of electronics unit 6, which means that the set-up inside the deformation member is further simplified. According to the exemplary embodiment, the device only measures the forces in the y direction, since the gap distance is changed, so that lateral interference forces in the x and z directions are not detected or measured, which means that the force component in the predetermined direction is precisely measured.

As an alternative to the represented, one-piece construction, tongue 2 is, for example, flexibly mounted to base part 3 via a hinge and optionally loaded by a spring, in order to move tongue 2 back into the starting position after removal of the load.

The device may be provided for detecting the seat occupancy of a motor vehicle, which means that unnecessary activation of an airbag is prevented. The occupant weight may also be determined by incorporating the device or a plurality of devices under the seat, which means that is possible to control the fill level of the airbag. The heavier the occupant, the greater the amount of air required in the airbag to ensure that the occupant is safely caught. The fill level of the airbag may be adjusted, for example, by firing the airbag in steps. Conversely, a reduced fill level is needed when the occupant is very light.

Figure 4:
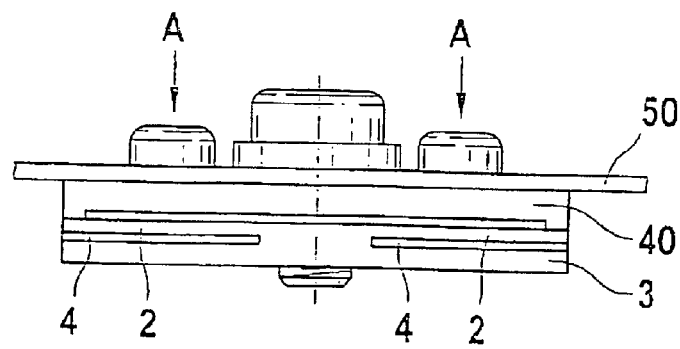
FIG. 4 is a side view of another exemplary embodiment of the device.

Another exemplary embodiment of the device is illustrated in FIG. 4, where two flexible tongues 2 are formed on base part 3, symmetrically to the center line. Consequently, two gaps 4 are formed between movable tongues 2 and base part 3, the gaps being able to be changed by introducing a force, and, in the exemplary embodiment represented, the force being introduced by a seat rail 50 of a motor-vehicle seat. As soon as an occupant sits on the motor-vehicle seat, forces pass through fastening points A to seat rail 50, pass through seat rail 50 to a solid plate 40, and are transmitted to movable tongues 2. Plate 40 is formed independently of base part 3 and movable tongues 2 and has a milled cut-out, so that the forces absorbed by seat rail 50 are only transmitted to tongues 2 at the outer regions of plate 40. This is explained in detail later.

The change is the gap width is then measured in a manner as described above, and then converted into an electrical signal that is analyzed.

Figure 5:
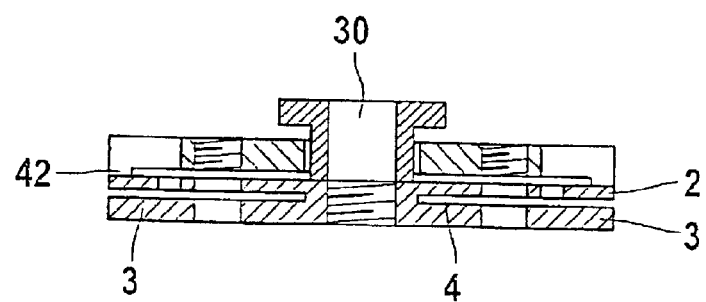
FIG. 5 is a sectional view in the drawing plane of the device according to FIG. 4.

A sectional view of FIG. 4 is represented in FIG. 5, where a spacer tube 30 situated above tongues 2 in the center of base part 3 is clearly seen. As indicated in FIG. 4, spacer tube 30 is attached to the body floor or another rigid base, via a centrally situated screw passing through a central bore, and is therefore fixed in relation to base part 3. At its top end, spacer tube 30 has a T-shaped collar whose bottom edge is a specific distance from the upper edge of plate 40. The T-shaped collar forms a limit stop for plate 40, if a movement occurs in the direction of the T-shaped collar in the case of an accident. In reference to the coordinate system used in FIGS. 1 through 3, this is a movement in the positive y direction. The maximum deflection capability of movable tongues 2 in the negative y direction is given by the gap width; upon reaching and exceeding the fixed measuring range, tongue 2 rests on base part 3 and prevents the measuring element from being destroyed.

Figure 6:
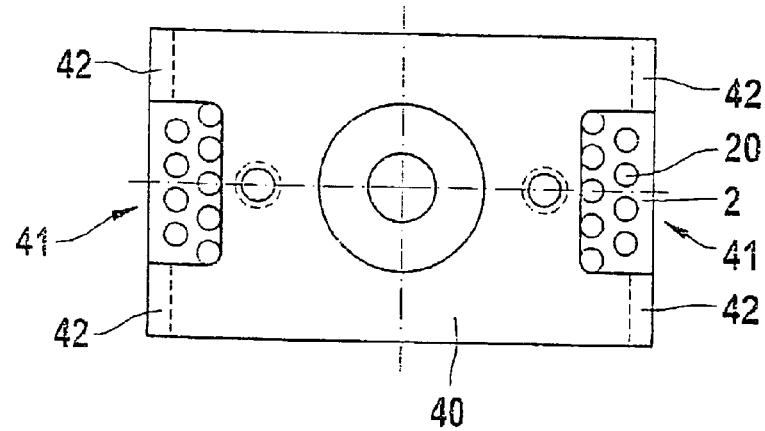
FIG. 6 is a plan view of the device according to FIG. 4.

FIG. 6 is a plan view of the device according to FIG. 4, where seat rail 50 has been removed so that plate 40 may be seen. Cut-outs 41 are introduced in plate 40 to the right and left of the center line, the cut-outs allowing, on one hand, a view of underlying tongue 2 and producing, on the other hand, force-introduction regions 42. Sketched in the views of FIGS. 4 and 5 is a ridge, which is parallel to the lateral edges of plate 40 and interrupted by recesses 41, so that rectangular force-introduction regions 42 acting on the ends of the tongues are formed at all four corners of plate 40. In response to the introduction of a force onto plate 40, the force is distributed to all four corners of the plate and introduced via force-introduction regions 42 to the corners of the two diametrically opposed tongues 2. Subsequent electronic compensation is allowed in this manner. The interpositioning of plate 40 also allows, e.g., seat rail 50 to be attached more easily, since plate 40 is solid and therefore offers good possibilities for attachment.

In addition, bores 20 are illustrated in FIG. 6, which are formed in movable tongue 2 and result in the weakening of the material and, therefore, a reduction in the flexural strength of elastic tongue 2, which is integrally formed in the present exemplary embodiment. Adjustments to the measuring range may be made by changing the number and configuration of bores 20, or by increasing the bore cross-section.

Figure 7:
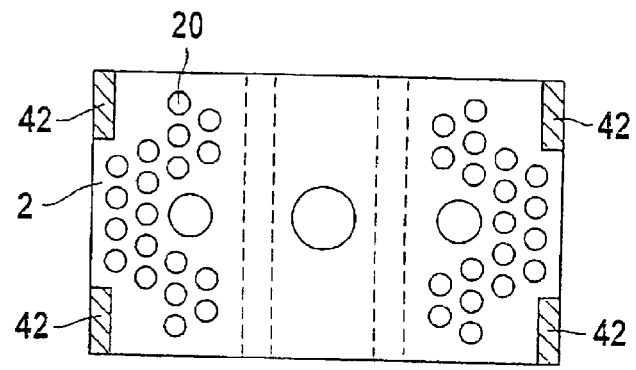
FIG. 7 is a sectional view perpendicular to the drawing plane, of the device according to FIG. 4.

Shown in FIG. 7 is a view of a section perpendicular to the plane of the drawing, the section being taken through the lower region of plate 40, so that force-introduction regions 42 are covered. Accordingly, these are drawn with hatching in FIG. 7; the rest of the view shows elastic tongues 2, as well as the bores situated in tongue 2. Here, it is clear that force-introduction regions 42 are arranged in a specularly symmetric manner, so that it is possible to electronically compensate for the introduced forces while preventing undesirable torques.

Figure 8:
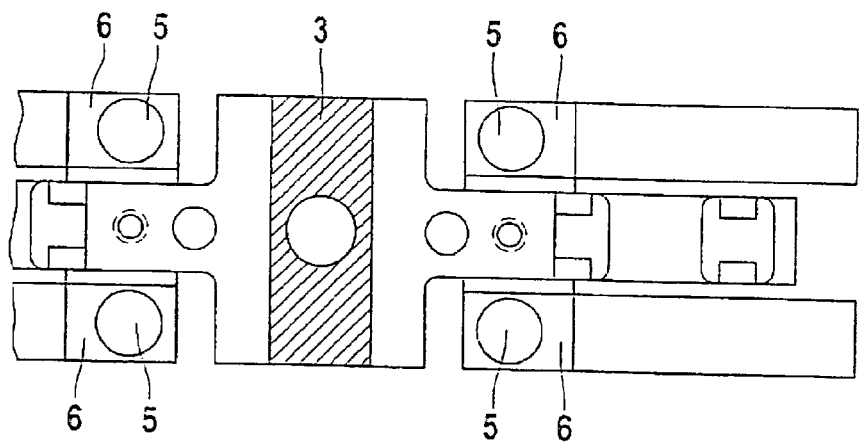
FIG. 8 is a sectional view perpendicular to the drawing plane, of the device according to FIG. 4.

FIG. 8 shows a view of a section perpendicular to the plane of the drawing, through gap 4, so that the center ridge of base part 3 is represented with hatching. From FIG. 8, it becomes clear that a measuring element 5 having an active surface sits underneath each force-introduction region 42, the measuring element detecting the change in the gap width and transmitting it to an electronics unit 6, which converts and evaluates the corresponding signals. As an alternative to the represented design having four separate measuring units, it is provided that these be positioned in one piece on a printed circuit board, the measuring elements being manufactured as, for example, printed inductance coils that may be on the printed circuit board (plastic, ceramic, etc.). Therefore, the measuring element and electronics unit are integrated to form a module, which means that manufacturing and assembly may be simplified.

Figure 9:
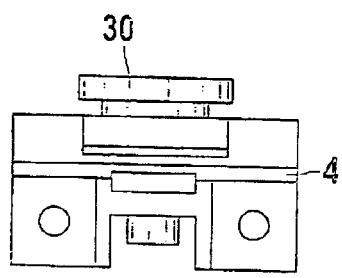
FIG. 9 a side view of the device according to FIG. 4.

Illustrated in FIG. 9 is a side view of FIG. 4, from which the attachment of the measuring elements and electronics unit 6 below tongues 2 is shown, as well as gap 4 formed by tongues 2.

As is clear from FIGS. 4 through 9, the deformation member may me made up of several separate pieces, e.g., a plate 40, as well as a base part 3 and elastic tongues 2 formed on it. As an alternative to a two-piece design, the tongue or tongues 2 may also be manufactured separately from base part 3 and connected by the central fastening screw within the scope of assembly. In contrast to the represented design, it is also possible that no base-part 3 stop face parallel to tongue 2 is formed, but that the gap is directly formed between a separate measuring element 5 and tongue 2, a limitation in the negative y direction being produced by a separate device, for example, a separate limit stop.

The deformation member may be made of metal and and may be fixed to the vehicle floor by a central screw. The fastening screw fixes base part 3 having integrally formed tongue 2 to the vehicle floor, via spacer tube 30, and attaches plate 40 to tongues 2.

What is claimed is:

1. A device for measuring at least one of a force component and a torque component, comprising:
    a deformation member;
    a separate measuring element configured to measure at least one force component; and
    an electronics unit connected to the measuring element configured to evaluate a measuring signal of the measuring element;
    wherein the deformation member includes a substantially fixed base part and at least one tongue movable with respect to the base part, the base part arranged so that a gap between the base part and the tongue has a gap width variable in response to the force component introduced onto the deformation member, the measuring element configured to convert a change in the gap width into a measuring signal.

2. The device as claimed in claim 1, wherein the deformation member, the measuring element and the electronics unit are separate modules.

3. The device as claimed in claim 1, wherein the measuring element and the electronics unit are at least partially surrounded by the deformation member.

4. The device as claimed in claim 1, wherein the measuring element is integral with the electronics unit.

5. The device as claimed in claim 1, wherein the deformation member is formed in one piece from the base part and the tongue.

6. The device as claimed in claim 1, wherein the deformation member is made of metal.

7. The device as claimed in claim 1, wherein the deformation member is made of at least one of steel and stainless steel.

8. The device as claimed in claim 1, wherein the measuring element is configured to operate capacitively, inductively, piezoelectrically, and magnetoelastically.

9. The device as claimed in claim 8, wherein the measuring element includes one of a capacitor, an inductance coil, a piezoelectric element, and a Hall-effect element.

10. The device as claimed in claim 1, wherein force-introduction regions are arranged to introduce the force component into the tongues in a precise manner.

11. The device as claimed in claim 10, wherein the force-introduction regions are positioned in mirror symmetry to each other.

12. The device as claimed in claim 10, wherein each force-introduction region is assigned one measuring element.

13. The device as claimed in claim 1, wherein the force component includes a weight of a motor vehicle seat occupant.

14. The device as claimed in claim 1, wherein the device is configured at least one of to detect seat occupancy and to determine occupant weight in a motor vehicle.

15. A device for measuring at least one of a force component and a torque component, comprising:
    a deformation member;
    a separate measuring element configured to measure at least one force component;
    an electronics unit connected to the measuring element configured to evaluate a measuring signal of the measuring element;
    wherein the deformation member includes a base part and at least one tongue movable with respect to the base part, the base part arranged so that a gap between the measuring element and the tongue has a gap width variable in response to the force component introduced onto the deformation member, the measuring element configured to convert a change in the gap width into a measuring signal; and
    at least one guide device configured to limit mobility of the tongue in at least one direction.

16. The device as claimed in claim 15, wherein the guide device includes a bolt and a passage, said passage at least one of positioned and formed on the tongue, said bolt connected to the base part, positioned perpendicularly to the base part, and at least partially passing through the passage.

17. The device as claimed in claim 15, wherein the guide device is configured to limit movement of the tongue at least one of in a direction of the measuring element and in a direction away from the measuring element.

18. The device as claimed in claim 17, wherein the limit device is arranged on one of the deformation member, the base part and the tongue.

19. A device for measuring at least one of a force component and a torque component, comprising:
    a deformation member;
    a separate measuring element configured to measure at least one force component; and
    an electronics unit connected to the measuring element configured to evaluate a measuring signal of the measuring element;
    wherein the deformation member includes a base part and at least one tongue movable with respect to the base part, the base part arranged so that a gap between the measuring element and the tongue has a gap width variable in response to the force component introduced onto the deformation member, the measuring element configured to convert a change in the gap width into a measuring signal, wherein at least one of the gap width and a flexural stiffness of the tongue is adjustable to a measuring range.

20. The device as claimed in claim 1, wherein two tongues are positioned on the base part in mirror symmetry to each other.

21. The device as claimed in claim 20, wherein ends of the tongues point in opposite directions.

22. A method for measuring at least one of a force component and torque component in accordance with a device including a deformation member, a separate measuring element configured to measure at least one force component and an electronics unit connected to the measuring element configured to evaluate a measuring signal of the measuring element, the deformation member including a substantially fixed base part and at least one tongue movable with respect to the base part, the base part arranged so that a gap between the base part and the tongue having a gap width variable in response to the force component introduced onto the deformation member, the measuring element configured to convert a change in the gap width into a measuring signal, comprising:

changing the gap width between the tongue and the base part by introducing the force component into the deformation member;

detecting the change in the gap width by the measuring element; and directing the measuring signal by the measuring element to the electronics unit for further processing as a function of the change in the gap width.

23. The method as claimed in claim 22, further comprising the step of determining torque from a load acting on at least two tongues.

24. The method as claimed in claim 23, further comprising the step of correcting measured force by arithmetic adjustment of an ascertained torque.

25. The method as claimed in claim 22, further comprising the step of at least one of detecting seat occupancy and determining occupant height in a motor vehicle.

26. A device for measuring at least one of a force component and a torque component, comprising:

a deformation member;

a separate measuring element configured to measure at least one force component; and an electronics unit connected to the measuring element configured to evaluate a measuring signal of the measuring element;

wherein the deformation member includes a base part and at least one tongue movable with respect to the base part, wherein the measuring element is positioned in proximity to one of the base part and the at least one tongue, and wherein a gap defined by the measuring element on a first side and the tongue on a second side has a gap width variable in response to the force component introduced onto the deformation member, the measuring element configured to convert a change in the gap width into a measuring signal.

* * * * *